Patented Nov. 16, 1943

2,334,476

UNITED STATES PATENT OFFICE 2,334,476

UNSATURATED ISOCYANATE

Donald Drake Coffman, Wilmington, Del., assignor to E. I. du Pont de Nemours & Company, Wilmington, Del., a corporation of Delaware No Drawing. Application September 4, 1940, Serial No. 355,411

1 Claim. (Cl. 260—453)

This invention relates to unsaturated compounds and polymers thereof.

This invention has as an object the provision of a process for preparing 1-alkenyl isocyanates in a pure state. A further object is the preparation of polymers of 1-alkenyl isocyanates. Another object is the preparation of polymers containing reactive isocyanate groups. A still further object is the preparation of agents for rendering fabrics water repellent. Other objects will appear hereinafter.

These objects are accomplished by the following invention wherein a monomeric 1-alkenylformyl azide having a methylene ($CH_2$) group attached by an ethylenic double bond to the carbon alpha to the formyl carbon is rearranged by heating to the corresponding 1-alkenyl isocyanate which is isolated and polymerized.

The monomeric 1-alkenylformyl azides are prepared through the reaction of the corresponding 1-alkenylformyl halide, preferably the chloride which is more readily accessible than the other halides, with a metallic azide, such as sodium azide, suspended in an inert liquid, and are preferably rearranged in situ to the monomeric 1-alkenyl isocyanates by the action of heat. Use of a liquid medium for the suspension of the metallic azide and as a solvent for both the acyl halide and the formed formyl azide provides a simple means for the uniform and controlled rearrangement, at temperatures near 100° C., of the formyl azide as it is formed. Because of the hazard in working with sodium azide and organic azides in general, precautions should be taken to insure the purity and the dryness of the reagents and the cleanliness of the equipment used, and to employ small quantities of materials. Water acting upon the acyl halide produces acids capable of liberating the very explosive hydrazoic acid from its salt, sodium azide, and furthermore reacts with the isocyanate. An excess of unreacted formyl azide in solution is avoided by carrying out the rearrangement so that the evolved nitrogen is always approximately equivalent to the acyl halide added. The sodium azide is preferably kept in excess. With a diminution in the rate of evolution of nitrogen, more acid chloride or sodium azide is added, depending upon the proportions of the two reagents previously added to the vessel and the total volume of nitrogen evolved. Where it is possible, particularly with the lower homologous 1-alkenyl isocyanates such as vinyl and isopropenyl isocyanates, it is desirable to choose a medium of higher boiling point than the isocyanate and distill the isocyanate from solution as rapidly as it is formed. This, however, is not necessary. The solution upon completion of the reaction may be filtered from the suspended solids and subjected to conventional fractional distillation and the isocyanates, if distillable, separated in this manner; or, if the isocyanates are not readily distillable as is sometimes the case with the higher homologues, the reaction medium can be removed by evaporation and the residue purified through elutriation, extraction and recrystallization.

The equipment is preferably set up behind a steel barricade and all required manipulations are done as much as possible from outside this barricade. The apparatus consists essentially of a vessel, in volume about twice the maximum volume of the added materials, equipped with a dropping funnel whose air volume is in direct contact with the vessel interior, a stirrer sealed against ingress of moisture and egress of interior gases (preferably not a mercury seal), and a short column leading to a trap cooled in dry ice and acetone and thence through a line of calcium chloride filled towers to a bottle designed to measure the amount of evolved gas by the amount of water displaced.

The 1-alkenylformyl azides can also be prepared by the reaction of nitrous acid upon the acyl hydrazide. The acyl azide so obtained is isolated and rearranged to the corresponding isocyanate. This method has the serious disadvantage that the azide must be isolated and carefully dried before rearrangement to the isocyanate. Not only is an extra preparative step introduced, but there is presented the possibility of accumulating a dangerously large supply of a highly explosive formyl azide. It is also possible to prepare the 1-alkenyl isocyanates by pyrolyzing, at elevated temperatures in the neighborhood of 400° C., the N-carbethoxy ketimines and aldimines obtained by reacting the corresponding ketals or acetals with ethyl urethane.

The isocyanates of this invention can be polymerized in bulk or in solution under anhydrous conditions at room temperature or higher temperatures, the polymerization being accelerated by such agents as ultra-violet light or peroxide catalysts.

The raw materials required in the preparation of 1-alkenyl isocyanates are a metallic azide, preferably sodium azide, the corresponding 1-alkenylformyl halide, preferably the acid chloride, and an organic liquid, inert and of suitable boiling range, as a medium for the reaction. Sodium azide, prepared by the action of nitrous oxide upon sodamide, is available commercially and is sufficiently pure, after thorough drying over phosphorous pentoxide, to be used in the reaction. The 1-alkenylformyl chlorides may be made from the corresponding acid or its sodium salt by the action of thionyl chloride, phosphorous oxychloride or phosphorous pentachloride. The yields of acyl chlorides are good and approach the theoretical value. These chlorides must be carefully purified to remove traces of free acid, phosphorous or sulfur compounds, and kept under anhydrous conditions until used. The inert medium must likewise be free of acid, water and any compound capable of reacting with the acyl chlorides, azides, and isocyanates.

In the following examples, the methacrylyl and acrylyl chlorides are prepared by the action of thionyl chloride and phosphorous pentachloride respectively upon the corresponding acids, and fractionally distilled. The dioxane used is refluxed over metallic sodium for 24 hours, and distilled from sodium.

The more detailed practice of the invention is illustrated by the following examples, wherein parts given are by weight. There are of course many forms of the invention other than these specific embodiments.

EXAMPLE I

Isopropenyl isocyanate

From a total of 110 parts sodium azide suspended in dioxane at 100° C., to which is added dropwise 90 parts methacrylyl chloride, there is obtained 40 parts or a 50% yield of pure isopropenyl isocyanate from fractionation of the crude isopropenyl isocyanate which distilled from the mixture during the progress of the reaction. This pure material boils at 42° C. under 390 mm. and at 37–38° C. under 302 mm.; $n_D^{25}$, 1.4020; $d_4^{25}$, 0.8776.

Analysis. Calc'd for $C_4H_5ON$: N, 16.86%. Found: N, 16.68%.

Isopropenyl isocyanate is readily converted to a crystalline derivative by reaction with alpha-naphthylamine. To a solution of 1.4 parts alpha-naphthylamine in 5 parts dry dioxane is added 0.8 part isopropenyl isocyanate. The compound that separates from the cooled dioxane, after recrystallization from dioxane, melts at 228° C. Its composition, corresponding to that of the desired N,N'-isopropenyl alpha-naphthylurea, is established by analysis.

Analysis: Calc'd for $C_{14}H_{14}ON_2$: N, 12.35%. Found: N, 11.78%.

EXAMPLE II

Isopropenyl isocyanate

If the isocyanate is not distilled from the reaction mixture as it is formed, but is separated from the reaction mixture, freed of suspended solids, by fractional distillation after completion of the reaction, a lower yield results because of polymerization of the isocyanate. This is illustrated by the following example. To a suspension of 104 parts of sodium azide in 70–100 parts of boiling benzene is slowly added 95 parts methacrylyl chloride. The solution is refluxed until the evolution of nitrogen ceases. The solution is filtered from the solids and distilled at atmospheric pressure through a meter long glass column packed with Fenske rings. Approximately 7 to 8 parts (or a 10% yield) of isopropenyl isocyanate are obtained, boiling at 62–63° C. under 757 mm.

Analysis: Calc'd for $C_4H_5ON$: N, 16.86%. Found: N, 16.29%.

EXAMPLE III

Vinyl isocyanate

To a stirred suspension of 25 parts dry sodium azide in 300 parts dry dioxane heated by an external bath maintained at 90 to 95° C. is added slowly 10 parts of acrylyl chloride. Under these conditions nitrogen is evolved at the rate of about 800° cc. per half hour. From a total of 125 parts sodium azide and 96 parts acrylyl chloride, there is obtained 15 parts or a 21% yield of vinyl isocyanate. On redistillation under nitrogen and at 660 mm. this material boils at 32° C. A white amorphous polymer is left in the flask as a residue, and a similar material is also deposited on the surface of the column upon completion of the distillation. The distillate, vinyl isocyanate, trapped at dry ice-acetone temperature and redistilled in an all glass thoroughly dried system, boils at 32° C. at atmospheric pressure; $n_D^{20}$, 1.4167; $d_4^{20}$, 0.9388.

Analysis for monomer: Calc'd for $C_3H_3NO$: N, 20.28%. Found: N, 21.14%.

Analysis for polymer: Calc'd for $(C_3H_3NO)_x$: N, 20.28%. Found: N, 20.45%.

Vinyl isocyanate is readily converted to a crystalline derivative by reaction with alpha-naphthylamine. To a solution of 1.4 parts alpha-naphthylamine in 5 parts dry dioxane is added 0.7 part vinyl isocyanate. A crystalline compound separates immediately from the warm solution; this, recrystallized twice from an 80/20 mixture of dioxane and acetone, melts sharply at 187.5° C. Confirmation of this compound's composition as corresponding to that of the urea, N,N'-vinyl alpha-naphthylurea or of its tautomeric aldimine, is afforded by the following data:

Analysis: Calc'd for $C_{13}H_{12}ON_2$: N, 13.20%. Found: N, 13.29%.

EXAMPLE IV

Polyvinyl isocyanate

Vinyl isocyanate polymerizes within a week at 30–40° C. under ultra-violet light to a white amorphous solid which darkens without melting at 300° C. and is insoluble in common solvents. This polymerization is effected conveniently in a vessel sealed to prevent ingress of moisture and escape of the volatile isocyanate.

Analysis: Calc'd for $(C_3H_3NO)_x$: N, 20.28%. Found: N, 19.71%.

EXAMPLE V

Polyisopropenyl isocyanate

Isopropenyl isocyanate polymerizes during 24 hours under anhydrous conditions at 70° C. using a trace of benzoyl peroxide as catalyst. The resulting polymer is yellow-colored, infusible, and insoluble in common organic solvents.

EXAMPLE VI

Polyisopropenyl urethane

Several days' refluxing of the polyisopropenyl isocyanate of Example V with absolute alcohol does not solubilize it, but does convert it to a polymer containing urethane groups and having 11.01% nitrogen as compared with the theory of 10.85% nitrogen in $(C_6H_{11}O_2N)_x$ and of 16.86% N for $(C_4H_5ON)_x$ of the polyisopropenyl isocyanate.

EXAMPLE VII

Polyisopropenylamine hydrochloride

Treatment of the polyisopropenyl isocyanate of Example V with concentrated hydrochloric acid on a steam bath for several hours results in practically complete solution of the polymer. Evaporation of the filtered aqueous acidic solution gives a brown solid which after treatment with a decolorizing agent and repeated extraction with absolute alcohol has a composition indicating that about one quarter of the isocyanate groups in the vinyl polymer have been converted to amine hydrochloride groups. This polymer is water soluble and contains ionic halogen.

Analysis: Calc'd for (3C₃H₅NCO)—C₃H₅NCl: Cl, 10.36%; N, 16.35%. Found: Cl, 10.35%, 11.71%; N, 14.96%.

The monomeric 1-alkenyl isocyanates of this invention have the general formula

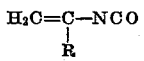

in which R is hydrogen or a monovalent acyclic radical. R may be saturated and unsaturated, alkyl, or alkoxy. R can be unsubstituted or substituted provided the substituent group does not possess an embodied or substituent functionality capable of reaction with the isocyanate group, i. e., R is free from active hydrogen atoms as determined by the Zerewitinoff test. (Berichte 40, 2023–31 (1907), 41, 2233–43 (1908)). Thus R can be hydrogen, methyl, ethyl, β-chloroethyl, allyl, n-butyl, propyl, isopropyl, methoxy, ethoxy, and heptyl.

Preferred subgenera are those wherein R is a hydrogen atom or an aliphatic group of which the sum of the atomic weights is less than 100, i. e., the monomer has a molecular weight of not more than 168. These are more conveniently prepared because they are more readily distillable in view of their limited molecular weight and are more easily purified.

In preparing the unsaturated isocyanates of this invention by the method illustrated in the preceding examples, any metallic azide may be used. While sodium azide is preferred because of its availability and relative stability, other metallic azides such as lithium or potassium azides can be used. The heavy metal azides are less desirable because of their instability to thermal and mechanical shock and the consequent hazard their use involves.

Any alpha-methylene, open chain, monocarboxylic acid, i. e., any open chain, monocarboxylic acid halide having a methylene (CH₂) group attached by an ethylenic double bond to the carbon alpha to the carboxylic halide group and free from active hydrogen may be employed including the acyl fluorides, bromides, and iodides as well as the chlorides, though, of these, the acyl iodides are least desirable because they are difficult to prepare and have poor stability. As examples of the acyl halides which can be employed may be mentioned acryloyl chloride, methacryloyl chloride, ethacryloyl chloride, butacryloyl chloride, heptacryloyl bromide, alpha-n-propylacryloyl chloride, alpha-isopropylacryloyl chloride, alpha-methoxyacryloyl chloride, and alpha-allylacrylol chloride.

The term "active hydrogen" is employed to designate hydrogen determined by the Zerewitinoff method (Hans Meyer—Analyse und Konstitutionsermittlung organischen Verbindungen 5th ed., pages 371-5, e. g., the hydrogen of hydroxyl (—OH), amino (—NH₂ or =NH), etc.

Any solvent inert to the acyl halide, the acyl azide and the 1-alkenyl isocyanate may be used. The medium can boil at any temperature in the range 36—250° C. but preferably in the range 65–120° C. That this medium have a boiling point higher than the expected isocyanate is optional but desirable.

In carrying out the reaction any temperature that furnishes a smooth and even rate of evolution of nitrogen is satisfactory. As a general rule, any temperature between 0° and 150° C. may be employed for the preparation and decomposition of the organic acyl azide.

It is not necessary that the isocyanate be removed from solution as rapidly as it is formed although it is preferable to do so when possible. The methods chosen for the separation of the isocyanate from its solution may be quite varied. If the isocyanate can be distilled at ordinary or slightly reduced pressures, it is most effectively purified in this way; if it cannot be, recourse may be had to recrystallization, molecular distillation, etc., of the solvent-free reaction residue. The type of equipment used is not limited to that described in the preceding examples, and it is not necessary that the rate of evolution of nitrogen be measured.

The polymerization of the monomeric isocyanates of this invention can be effected in bulk at any temperature below decomposition temperatures, in the presence of light as catalyst or using any relatively stable organic peroxide as catalyst, in open or closed containers, providing that the open containers do not permit loss of the more volatile compounds or the ingress of moisture, and at subatmospheric, atmospheric, or superatmospheric pressures. The polymerizations can also be carried out by dispersing the monomeric materials in appropriate media inert to the isocyanate.

The monomeric 1-alkenyl isocyanates of this invention, e. g., vinyl isocyanate, and isopropenyl isocyanate, may be copolymerized in varying concentration and under a variety of conditions, as more fully described and claimed in my copending application Serial No. 355,412 filed herewith, with known polymerizable monomeric organic compounds having the methylene (CH₂) group attached by an ethylenic double bond to a carbon which is in turn attached to a negative group, e. g., RCO—, RCOO—, NO₂—, C₆H₅—, C₁₀H₇—, C₆H₅—, RO—, NC—, RNHCO—, NH₂CO—, (RCO)₂N—, RCONH—, Cl—, CH₂=CH—, RCH=CH—, CH≡C—, HOOC—CH=CH—, CH₂=CH—O—, (R being alkyl or aryl, including vinyl or vinylidene derivatives, e. g., styrene, vinyl acetate, methyl methacrylate, unsymmetrical dichloroethylene, vinyl chloride, vinyl bromide, butadiene, isoprene, methylchloroprene, chloroprene, bromoprene, and methyl alpha-chloroacrylate. These copolymers are altered in physical properties such as hardness and softening temperatures, and also possess the unique advantage of having reactive isocyanate groups. Thus, copolymers such as that of 30% isopropenyl isocyanate with 70% methyl methacrylate when applied from organic solvent solutions to fabric impart a definite and durable water repellency which is not destroyed by laundering.

The polyisocyanates also react with a variety of materials containing active hydrogen such as hydroxylated compounds to produce polyurethanes and with aqueous mineral acids to produce polyamine salts.

The above description and examples are intended to be illustrative only. Any modification of or variation therefrom which conforms to the spirit of the invention is intended to be included within the scope of the claim.

What is claimed is:

Isopropenyl isocyanate.

DONALD DRAKE COFFMAN.